Patented Jan. 9, 1945

2,366,855

UNITED STATES PATENT OFFICE 2,366,855

METHOD OF MAKING PIGMENTS

Joseph C. Heckman, Pittsburgh, Pa.

No Drawing. Application December 27, 1941,
Serial No. 424,647

4 Claims. (Cl. 106—304)

My invention relates to the manufacture of iron-containing pigments such as are employed in coloring or tinting, or as pigment fillers in rubber, paper, plastics etc. or as rouges.

The invention has for its object the making of iron-oxide pigment products of high quality and improved shades and brilliancy, at low cost.

Pigment made by my process is of high quality such as those known as Persian Gulf and Spanish Oxide which are commonly made of fine iron ore. In making these two kinds of pigments, the fired product is very hard and requires extended grinding to pulverize it, with great wear on the grinding machinery. My fired product is more friable and can be pulverized readily, with much less grinding force, and at a saving of perhaps $7.00 per ton as compared to the cost of grinding the other product.

In its preferred embodiment, my invention includes the use of iron sulphates which may be waste materials such as copperas or coal mine sulphur mud that is a precipitate of water drained from coal mines; or may be sulphate of iron procured by treating with sulphuric acid, iron sludge that is discarded in the making of aniline oil or kindred products, blast furnace flue dust, pyrites cinder (obtained from sulphur pyrites after the sulphur has been burned out), or fine iron ore. In transforming these latter-named material to iron sulphates, I mix them with sulphuric acid or sulphur and an acid. The sulphuric acid will preferably be diluted with water, to facilitate mixing, and to give it activity.

Preliminary to calcining the iron sulphate, I mix therewith a tar or tar products that contain creosote, or creosote alone. Coal tar or the like contains creosote, as do also some pitches that will usually melt at about 300 degrees F. Various tars are suitable, whether derived from coal, peat, or wood, etc.

The tar or creosote is usually in a liquid condition and is mixed with the iron sulphate in quantities of from .5% to 25% by weight of the complete mixture, depending upon the shade or tone desired in the completed product. In the use of coal tar, I found that 1.25% to 5%, by weight, gave good results on certain desired colors, and a wide variety of colors were secured by other percentages.

I have used refined creosote 1.25% to 5% of the weight of the iron sulphate, with good results. The use of 5% required somewhat longer burning, but produced good color.

This mixture is then fired in a furnace which is at temperatures of from 1200 degrees F. to 1800 degrees F., for a period of three hours to five hours, depending upon the depth of shade desired. The larger percentages of tar or creosote, give a deeper red or bright blue tone to the completed pigment. After firing, the material will be pulverized in a suitable grinder.

It is not essential that the sulphate of iron be produced or prepared in advance of mixing with the tar, since I may take any finely-divided iron such as pyrites cinder, blast furnace flue dust, aniline sludge, hydrated iron oxide, or iron ore, and mix the sulphuric acid therewith when introducing the creosote-containing material into the mixture.

An important advantage resulting from the use of the tar products in the calcining of sulphate of iron, is that they remove or neutralize the sulphuric acid. Some materials, such as copperas or coal mine sulphur mud, may contain so much acid that the acid cannot, by the former practice, be burned off except through such long firing and high temperatures that the color of the pigment is injuriously affected. The sulphuric acid is useful in giving color to the pigment while burning, but it has to be eliminated, otherwise it will be deleterious to the paint mixture or other products in which the pigment is used.

By long firing (perhaps 8 to 10 hours) at about 1500° F. it is sometimes possible to burn off the acid, but at that temperature the brilliancy of color of the pigment is much diminished, in the case of some materials such as copperas. By the former methods, it is not possible to burn off the acid completely, and the calcined product, therefore, has to be washed with water to remove the remaining acid, thereby necessitating drying and grinding.

I have found that by the use of the tar products referred to, it is possible to burn off the acid by firing for a period not to exceed three hours, at a temperature of 1250° F. for the first hour and raising the temperature to about 1500° F. for the remaining part of the firing period. The acid is so completely removed that no washing of the pigment is required, thus greatly reducing the cost of production, both in saving of burning time and the expense of washing and drying.

While I have herein referred generally to tar and tar products, it is to be understood that such terms are used broadly to include bitumen or bituminous substances.

I claim as my invention:

1. The method which comprises calcining a mixture containing mainly sulphate of iron and also having a creosote-containing material, the creosote content constituting from 1% to 5% of the mixture, by weight.

2. The method of making pigment material, which comprises calcining a mixture containing mainly sulphate of iron and creosote, the creosote content being not substantially less than 1% of the mixture, by weight.

3. The method of making pigment, which comprises calcining a mixture containing mainly coal mine mud and having a creosote content that is not substantially less than 1% of the mixture, by weight.

4. The method of making pigment material, which comprises calcining a mixture consisting mainly of sulphate of iron and having a tar product that contains creosote in quantity not substantially less than 1% of the mixture, by weight.

JOSEPH C. HECKMAN.